United States Patent [19]

Coulter et al.

[11] 3,847,598

[45] Nov. 12, 1974

[54] MERCURY RECOVERY PROCESS

[75] Inventors: Michael Oliver Coulter; David Bell, both of Holmes Chapel, near Crewe, England

[73] Assignee: BP Chemicals Limited, London, England

[22] Filed: Sept. 20, 1973

[21] Appl. No.: 399,057

Related U.S. Application Data

[63] Continuation of Ser. No. 212,788, Dec. 27, 1971, abandoned.

[30] Foreign Application Priority Data

Dec. 31, 1970 Great Britain .................... 61948/70

[52] U.S. Cl. ...................... 75/121, 75/108, 210/50, 423/99, 423/101, 423/107
[51] Int. Cl. .......................................... C22b 43/00
[58] Field of Search .......... 75/121, 81, 108; 204/99; 423/107, 99, 101; 210/45, 48, 50

[56] References Cited
UNITED STATES PATENTS

| | | | |
|---|---|---|---|
| 3,039,865 | 6/1962 | Gilbert et al. ........................... | 75/81 |
| 3,437,476 | 11/1970 | Dotson .................................. | 75/103 |
| 3,537,843 | 11/1970 | Jacobowsky .......................... | 75/81 |
| 3,647,359 | 3/1972 | Bell ...................................... | 75/121 UX |
| 3,695,838 | 10/1972 | Knepper et al. ..................... | 75/108 X |
| 3,785,942 | 1/1974 | Carlson ................................ | 75/121 X |

OTHER PUBLICATIONS

Rosenzweigh, "Chemical Engineering," Feb. 22, 1971, pp. 70–71.

Primary Examiner—Herbert T. Carter
Attorney, Agent, or Firm—Brooks Haidt & Haffner

[57] ABSTRACT

Mercury is recovered from aqueous solutions containing elemental mercury in finely divided or colloidal form or in the form of a soluble inorganic compound by passing a stream of inert gas eg., air or nitrogen through the aqueous solution in the presence of a reducing agent, preferred reducing agents being ferrous sulphate at a pH greater than 5, hydrazine, hydroxylamine, D-glucose and sodium borohydride in alkaline solution.

It is advantageous to operate at temperatures in the range 35°C to 95°C.

9 Claims, No Drawings

MERCURY RECOVERY PROCESS

This is a continuation of application Ser. No. 212,788, filed Dec. 27, 1971 now abandoned.

The present invention relates to a method of recovering mercury from aqueous solutions in which the mercury is present in the elemental or combined form.

In the manufacture of chlorine and caustic soda by the mercury cathode process the depleted brine leaving the electrolysis cells contains a small concentration of mercury usually between 2 and 10 mg/l. If this depleted brine is discharged to waste the value of the lost mercury is significant and the receiving water course may be polluted with mercury compounds to an unacceptable level. Even if the brine is recycled by saturating it with solid salt followed by the addition of reagents such as barium chloride or carbonate, sodium carbonate or sodium hydroxide to remove impurities derived from the solid salt some or all of the mercury present in the depleted brine may be lost with the precipitate. This loss is particularly severe if sodium sulphide is used in the brine treatment process to remove residual free chlorine and to precipitate heavy metals. Removal of mercury from the depleted brine is even more important if the weak brine is resaturated by pumping it into underground rock salt strata because its presence may cause serious corrosion of the pipelines and well tubing and some mercury would otherwise be lost in the brine that remains in the underground cavity. The liquid effluent from plants in which mercury compounds are processed or mercury is used in the manufacture of, for example, chlorine, are liable to contain mercury salts in solution in addition to elemental mercury. It is desirable that this mercury should be removed not only for economic reasons but even more important to prevent pollution of receiving water courses.

Known processes for the removal of mercury from aqueous solutions include treatment with sodium sulphide, passage through a tower packed with steel turnings, percolation through a bed of activated carbon and treatment with ion exchange resins. All these processes suffer from disadvantages. Thus treatment with sodium sulphide has the following disadvantages:

a. It is difficult to control the process so that the final mercury content is sufficiently low, i.e. 0.1 mg/l or less.

b. Any excess of sodium sulphide, which is itself a polluting material, is liable to re-dissolve precipitated mercuric sulphide.

c. Very large vessels with long retention times may be necessary to settle out the precipitate even with the aid of entrainers such as iron salts and flocculents.

d. Recovery of the mercury from the precipitated mercury sulphide is difficult and expensive.

The disadvantages of removing mercury by percolation through a bed packed with steel turnings are as follows:

a. The process is slow and requires a large volume of steel turnings.

b. Steel is liable to become inactive through amalgamation.

c. The mercury separates as a slime which requires further processing such as distillation before it can be recovered in useable form.

The use of activated carbon is not normally satisfactory because mercury is adsorbed irreversibly and the capacity for mercury adsorption is small, although these disadvantages can be overcome by prior treatment of the activated carbon with a solution of a soluble sulphide according to our co-pending British application No. 06106/71.

Certain specialized ion exchange and chelation resins are claimed to be suitable for removal of inorganic mercury compounds from aqueous solutions. However, before a mercury containing solution can be treated in this way it must be free from suspended solids, and high equipment costs would be incurred if large volumes of liquor had to be treated by filtration or sedimentation. To recover mercury that has been removed by these resins it is necessary either to destroy the resin by retorting or to employ leaching procedures which involve several processing steps.

The present invention provides an improved process for the recovery of mercury from aqueous solutions in which the mercury is present either as elemental mercury in finely divided or colloidal form or in the form of a soluble inorganic compound. The process is particularly applicable for the recovery of small concentrations of mercury e.g. in the range 1 to 100 mg/litre.

Thus according to the present invention there is provided a process for recovering mercury from aqueous solutions containing elemental mercury in finely divided or colloidal form or in the form of a soluble inorganic compound which process comprises passing a stream of inert gas through the aqueous solution in the presence of a reducing agent and subsequently recovering the mercury vapour from the inert gas stream.

Any inert gas may be used in the process of the invention but it is preferred to use air or nitrogen.

It is advantageous to carry out the process at elevated temperatures in order to accelerate the rate of reaction and to increase the vapour pressure of the metallic mercury. Thus temperatures in the range 5°C to 100°C are preferred and temperatures in the range 35° to 95°C are even more preferred.

Reducing agents which may be used in the process of the invention include ferrous sulphate at a pH greater than 5, iron or steel turnings or chips, hydrasine, hydroxylamine, D-glucose and sodium borohydride. When hydrasine, hydroxylamine, D-glucose or sodium borohydride are used it is preferable to operate in alkaline solution, suitably at about pH 11. The preferred reducing agent is sodium borohydride.

The amount of reducing agent required in the process of the invention varies over a wide range and depends amongst other factors on the nature of the reducing agent and the compounds other than mercury compounds present in the aqueous solution. For sodium borohydride as little as a stoichiometric equivalent might be employed, whilst for ferrous sulphate more than 20 times the stoichiometric equivalent based on mercury might be required in the absence of reducible compounds of other metals.

The process of the invention may be extended to materials containing mercury in other forms, for instance organic mercury compounds or inorganic compounds insoluble in water, or as elemental mercury that is not in a sufficiently fine state of sub-division for the efficient operation of the process. In these cases it is necessary to convert the mercury to an inorganic compound soluble in water by a suitable pre-treatment. For example, elemental mercury may be oxidised with chlorine and organic compounds of mercury may be treated with nitric acid to convert them to soluble inorganic compounds. It may then be necessary to destroy any excess of the oxidising agent used.

It is possible to operate the process economically even in the presence of oxidising agents, such as hypochlorites and chlorates, which are commonly present in lean brine and in waste waters arising in the manufacture of chlorine by electrolysis of brine in mercury cathode cells. For instance an inexpensive reducing agent such as sodium sulphite or sulphur dioxide may be used to chemically reduce hypochlorites. It is then possible to reduce mercuric ions to elemental mercury with the stoichiometric quantity or a small excess only of sodium borohydride, which is a costly reducing agent, and this second state of reduction can be accomplished selectively even in the presence of soluble chlorates. The reducing agents listed above have been found effective in the presence of a high chloride concentration.

It is believed that, except possibly when reduction takes place in the presence of solids such as iron or ferrous hydroxide, the process is most efficient when the mercury is present in what might be described as the "nascent" form is immediately after chemical reduction before the atoms of mercury have had time to agglomerate beyond colloidal form. With most reducing agents the efficiency is greatest when addition of the reducing agent and inert gas blowing are simultaneous, although with D-glucose a short reaction time may be advantageous.

The mercury present as vapour in the inert gas stream may be recovered by any suitable means but may conveniently be recovered in useable form by the processes described in our copending British Patent Application numbers 25609/68 and 44984/68 now British Patent Nos. 1,207,215 and 1,250,171, respectively. British Patent Application number 25609/68 describes a process for recovering mercury vapour from the degassing air stream removed from the wash boxes for washing the mercury amalgam circulating through mercury cathode electrolytic cells by washing the stream with a solution of brine containing dissolved chlorine and cycling the brine solution containing the mercury to a mercury cathode electrolytic cell. British Patent Application number 44984/68 describes a method for recovering mercury from a stream of gas containing mercury vapour by scrubbing the stream with alkaline alkali metal hypochlorite solution containing an alkali metal chloride or calcium chloride substantially in excess of the chemical equivalent of the alkaline hypochlorite.

The process of the invention is also useful for removing the last few parts per million by weight of mercury from caustic soda solutions manufactured by the mercury cathode process. It is particularly desirable that the mercury contaminant should be removed to improve the purity of the product if it is to be used in foodstuffs manufacture.

The invention is illustrated by the following examples:

EXAMPLE 1

To a solution containing approximately 40 g/$l$ sodium chloride, 2.8 mg/$l$ available chlorine and 1.7 mg/$l$ of mercury at 70°C and pH 10.6 was added sufficient ferrous sulphate to provide 0.2 g/$l$ of iron. A stream of air was simultaneously blown through the solution from a diffuser plate. After 1 minute the mercury content of the solution had been reduced to less than 0.1 mg/$l$.

EXAMPLE 2

A solution containing approximately 2 mg/$l$ mercury, added as mercuric chloride, was passed through a bed of crescent-shaped mild steel chips held on a diffuser plate at a temperature of 65°C and a pH of 10. The chips were approximately 1.3 cm diameter and had a maximum thickness of 0.5 cm. The volume of the bed was 3,500 cm$^3$ and the height 10 cm. At the same time a stream of air was blown through the bed from the diffuser plate. The effluent stream contained 0.02 mg/$l$ of mercury i.e. 99% of the mercury had been removed. The mean retention time in the reactor was 10 minutes. Under the same conditions, but without the stream of air, the effluent stream contained 0.20 mg/litre mercury, i.e. air blowing had improved the removal of mercury significantly.

Similar results were obtained when the pH of the solution was 3.

EXAMPLE 3

To a solution containing 200 g/litre sodium chloride and 3.9 mg/litre mercury was added 200 mg/litre hydrazine sulphate. The temperature of the mixture was 63°C and the pH, 11.0. A stream of air was blown through the solution from a diffuser plate. After 1 minute the mercury content of the solution had been reduced to 0.12 mg/litre. After 10 minutes the mercury content of the solution was 0.03 mg/litre.

EXAMPLE 4

To a solution containing 200 g/litre sodium chloride, 5 mg/litre available chlorine and 3.8 mg/litre mercury was added 43 mg/litre hydroxylamine hydrochloride. The temperature of the mixture was 62°C and the pH, 11.0. A stream of air was blown through the solution from a diffuser plate. After 1 minute the mercury content of the solution had been reduced to 0.11 mg/litre.

EXAMPLE 5

To a solution containing 200 g/litre sodium chloride and 4.2 mg/litre mercury was added 14.3 mg/litre D-glucose. The temperature of the mixture was 62°C and the pH 11.0. After a reaction time of 5 minutes a stream of air was blown through a solution from a diffuser plate. After a further 1 minute the mercury content of the solution had been reduced to 0.9 mg/litre. After 10 minutes air blowing the solution contained 0.06 mg/litre mercury.

EXAMPLE 6

To a solution containing 200 g/litre sodium chloride and 3.9 mg/litre mercury was added 0.29 mg/litre sodium borohydride. The temperature of the mixtureu was 60°C and the pH 11. A stream of air was blown through the solution from a diffuser plate. After 1 minute the mercury content of the solution was reduced to 0.24 mg/litre. After 10 l minutes the solution contained 0.06 mg/litre mercury.

EXAMPLE 7

To a solution containing 250 g/litre sodium chloride, 20 mg/litre available chlorine, 2.0 g/litre sodium chlorate and 4.1 mg/litre mercury at 61°C and pH 11 was first added 143 mg/litre $Na_2SO_3 \cdot 7H_2O$ to reduce the available chlorine only. To the mixture was added 0.29 mg/litre sodium borohydride. A stream of air was then blown through the solution from a diffuser plate. After 1 minute the mercury content of the solution was reduced to 0.06 mg/litre.

This example demonstrates the stagewise reduction of chlorine and mercury in the presence of sodium chlorate, using sodium sulphite and sodium borohydride.

We claim:

1. A process for recovering mercury from aqueous alkaline solutions containing mercury in the form of a soluble inorganic compound which process comprises passing a stream of inert gas through said aqueous alkaline solution at a temperature in the range of 5° to 100°C in the presence of a reducing agent active for the chemical reduction of said inorganic mercury compounds to elemental mercury selected from the group consisting of ferrous sulphate, hydrazine, hydroxylamine, D-glucose, and sodium borohydride, and subsequently recovering the mercury vapor from the inert gas.

2. A process according to claim 1 wherein the temperature is in the range of 35° to 95°C.

3. A process according to claim 1 wherein the inert gas is air or nitrogen.

4. A process according to claim 1, wherein the pH of the aqueous solution containing the inorganic mercury compound is adjusted to a value of about 11.

5. A process according to claim 1, wherein the reducing agent is sodium borohydride.

6. A process according to claim 1, wherein an initial reducing agent selected from the group consisting of sodium sulphite and sulphur dioxide is used to reduce oxidizing agents other than mercury compounds which are present in the aqueous alkaline solution, and a final reducing agent selected from the group consisting of hydrazine, hydroxylamine, D-glucose, and sodium borohydride is used for the final reduction of the mercury salts.

7. A process according to claim 1, wherein the mercury vapor is recovered from the inert gas stream by washing the stream with a solution of brine containing dissolved chlorine and cycling the brine solution containing the mercury to a mercury cathode electrolytic cell.

8. A process according to claim 1, wherein the mercury vapor is recovered from the inert gas stream by scrubbing the stream with an alkaline solution of an alkali metal hypochlorite containing an alkali metal chloride or calcium chloride substantially in excess of the chemical equivalent of the alkali metal hypochlorite.

9. A process according to claim 1, wherein the alkaline aqueous solution is a caustic soda solution manufactured by the mercury cathode process.

* * * * *